United States Patent
Kellermann

[11] Patent Number: 6,081,190
[45] Date of Patent: Jun. 27, 2000

[54] TURN SIGNAL INDICATOR ASSEMBLY

[76] Inventor: Guido Kellermann, Meinhövelstrasse 4, 48167 Münster, Germany

[21] Appl. No.: 09/259,514

[22] Filed: Feb. 26, 1999

Related U.S. Application Data

[63] Continuation of application No. 08/865,234, May 29, 1997, abandoned.

[30] Foreign Application Priority Data

Jun. 10, 1996 [DE] Germany .................. 196 23 068

[51] Int. Cl.$^7$ .................. B60Q 1/34; H01H 9/04
[52] U.S. Cl. .................. 340/465; 340/432; 340/475; 74/551.9; 200/61.27; 200/61.12; 200/61.85; 200/293.1; 362/474
[58] Field of Search .................. 340/465, 475, 340/476, 477, 432; 74/551.9, 502.2, 484 R; 200/61.12, 61.27, 61.85, 61.88, 293.1, 61.56; 362/72

[56] References Cited

U.S. PATENT DOCUMENTS

| | | | |
|---|---|---|---|
| 3,894,207 | 7/1975 | Jelley | 200/61.85 |
| 4,361,829 | 11/1982 | Kramholler et al. | 200/61.37 |
| 4,623,954 | 11/1986 | Schott et al. | 362/72 |
| 4,875,142 | 10/1989 | Spector | 362/72 |
| 5,247,431 | 9/1993 | Liu | 362/72 |

FOREIGN PATENT DOCUMENTS

| | | |
|---|---|---|
| 1 450 781 | 12/1966 | France . |
| 1 814 634 | 5/1960 | Germany . |
| 1 849 287 | 5/1960 | Germany . |
| 1 840 288 | 6/1960 | Germany . |
| 1 111 969 | 7/1961 | Germany . |
| 32 21 285 | 12/1983 | Germany . |
| 296 04 320 U | 9/1996 | Germany . |
| 834 060 | 5/1960 | United Kingdom . |

OTHER PUBLICATIONS

Becker, C., Wo viel Blinklicht ist, da sind auch schwarze Schatten, Moped, Roller, Kraftrad, vol. 8., No. 7, Jan. 1961, p. 295–299.

*Primary Examiner*—Donnie L. Crosland
*Attorney, Agent, or Firm*—Henry M. Feiereisen

[57] ABSTRACT

A turn signal indicator assembly, in particular for motorcycles, includes a turn signal indicator attached to one end of a handlebar and having a mass of at least 150 gram. The mass of the turn signal indicator and its securement to the end of the handlebar suppresses vibrations by reducing the amplitude and frequency of vibrations generated during operation.

20 Claims, 1 Drawing Sheet

TURN SIGNAL INDICATOR ASSEMBLY

This is a continuation of patent application Ser. No. 08/865,234, filed May 29, 1997 now abandoned.

BACKGROUND OF THE INVENTION

The present invention refers to a turn signal indicator assembly, and in particular to a turn signal indicator assembly for motorcycles such as motor bicycle, moped, small-capacity motorcycle, light motorcycle, etc..

Motorcycles are typically equipped with an electric system for signaling a change of traveling direction, with the electric system substantially comprised of turn-signal flasher, actuating switch and four signal lamps arranged in paired disposition. One pair of signal lamps are positioned in the area of the tail lamps and radiates rearwards while the other pair of signal lamps is mounted to the front wheel fork and radiates in forward direction.

In general, the placement of the front signal lamps at the ends of the handlebar is more preferred because such arrangement enhances the overall visibility of the signal, especially from the side, e.g. for the driver of a motor vehicle standing next to the motorcycle. However, attempts to position the front signal lamps in this area were thwarted by frequent malfunctions such as faulty contacts, tear-off of the spiral-wound filament, as a result of vibrations of the handle bar ends. Moreover, a retrofitting of commercially available turn signal indicators for attachment on the handlebar ends is relatively complicated and requires mechanical skills. Also, the generation of vibrations at the ends of the handlebar of a motorcycle not only adversely affects the service life of such turn signal indicators but significantly impairs also the comfort and thus concentration and safety of the driver. During operation of the motorcycle, the grip portion and other operating devices such as handgrip for front wheel brake, gas grip, clutch actuator, horn, light, turn signal switch may be subjected to so severe vibrations, even with modern motorcycles, that the driver experiences already after a short period a numb feeling in the hands despite the provision of rubber grips and gloves.

SUMMARY OF THE INVENTION

It is thus an object of the present invention to provide an improved turn signal indicator assembly, obviating the afore-stated drawbacks.

In particular, it is an object of the present invention to provide an improved turn signal indicator assembly that can be mounted at the end of the handlebar of a motorcycle without being subject in a significant manner to disturbing vibrations.

It is yet another object of the present invention to provide an improved turn signal indicator assembly that is so secured as to effect a significant suppression of amplitude and frequency of vibrations on the handlebar ends.

These objects and others which will become apparent hereinafter are attained in accordance with the present invention by providing a turn signal indicator which is mounted to one end of a handlebar of a motorcycle and has a mass of at least 150 gram.

Preferably, the turn signal indicator has a main body or housing of such configuration as to form a mass damper. The selection of a suitable mass damper depends on a number of parameters, such as material, wall thickness, diameter and length of the handlebar, preferred range of engine speed, design of motor suspension and undercarriage. In general, the frequency of vibration decreases with increase of the mass at the handlebar end. Good results can be achieved for current motorcycle designs with a mass of the turn signal indicator assembly of at least 150 gram. A preferred range for practical use lies between 200 to 400 gram.

Through the provision of a mass damper, vibration of the handlebar ends is also effectively counteracted, thus significantly increasing the comfort for the driver.

The effectiveness of the turn signal indicator assembly of the present invention depends also on the configuration of the connection between the handlebar end and the turn signal indicator. Preferably, the turn signal indicator is detachably secured to one end of the handlebar. As a result, the handlebar of existing motorcycles can easily be retrofitted later with a turn signal indicator according to the present invention.

Suitably, the turn signal indicator and the handlebar are mounted to one another not in a rigid manner but rather by a vibration-mechanically hinged connection, e.g. through incorporation of a rubber piece. In an optically pleasing and technically advantageous manner, the vibration-mechanically hinged connection is arranged in an open end of the handlebar.

According to another feature of the present invention, the turn signal indicator assembly includes as lamp unit in the form of a halogen lamp. As a result of the higher light efficiency of the halogen lamp compared to conventional bulbs, the other traffic is in a position to much better see the signal indicator when the motorcyclist signals a directional change. Moreover, the use of a halogen lamp enables a compact structure so that the given space of the housing of the turn signal indicator can be better exploited for installation of a greater mass.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
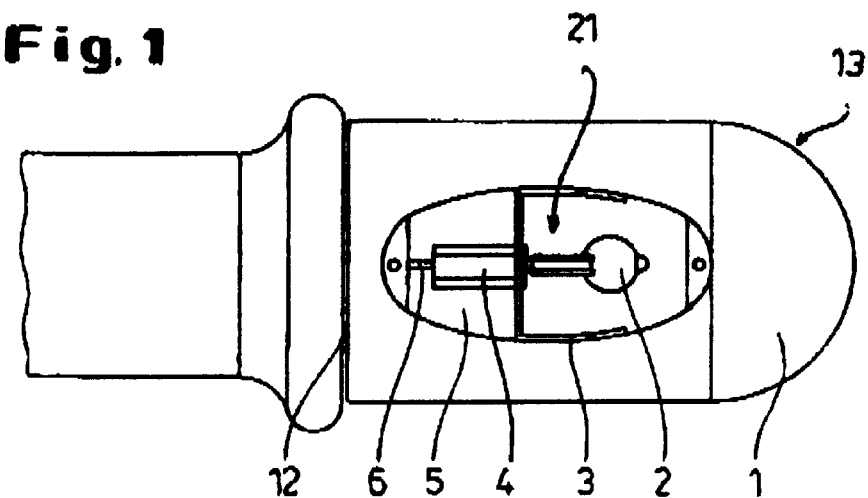
FIG. 1 is a side view of one embodiment of a turn signal indicator assembly according to the present invention.

Throughout all the Figures, the same or corresponding elements are generally indicated by the same reference numerals.

Figure 2:
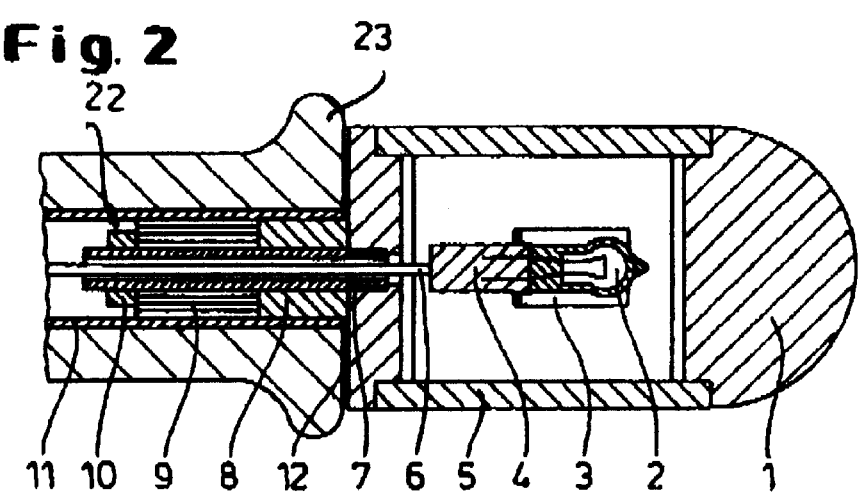
FIG. 2 is a sectional top view of the turn signal indicator assembly.

Turning now to the drawing, and in particular to FIG. 1, there is shown a side view of one embodiment of a turn signal indicator assembly according to the present invention, including a turn signal indicator, generally designated by reference numeral 13 and a mounting, generally designated by reference numeral 22 and shown in more detail in FIG. 2, for securing the turn signal indicator 13 to one axial end 12 of a handlebar 11 of a motorcycle (not shown), with the handlebar 11 being enclosed at its end by a grip portion 23. It will be understood that the handlebar 11 is provided on each axial end with such a turn signal indicator assembly;

however for sake of simplicity, only the right hand turn signal indicator assembly is shown in the drawings.

The turn signal indicator 13 has a main body or housing 1 constituting the actual mass damper which is of a massive constitution and made from a heavy material such as special steel. At a central location thereof, the housing 1 is formed with a cavity which is bounded by two orange-colored transparent glasses 5 of plastic material and has installed therein a lamp unit, generally designated by reference numeral 21. The lamp unit 21 includes a sheet metal retainer 3 for securement of a lamp socket 4 for receiving a conventional halogen bulb 2. A supply cable 6 (positive connection of signal flasher, ground) is conducted to the outside through a threaded pipe 7 (FIG. 2) which extends through a bore outwardly from the housing 1 in axial direction. The housing 1 together with the lamp unit 21, plastic glasses 5 and threaded pipe 7 have a mass of about 250 gram.

The threaded pipe 7 forms part of the mounting 22 which further includes a spacer 8 placed on the threaded pipe 7 and extending between the axial handlebar end 12 and a rubber piece 9 in the form of a hollow cylinder, with the rubber piece 9 being placed on the threaded pipe 7. A nut 10 is screwed onto the threaded pipe 7 to secure the rubber piece 9 and the spacer 8 in place, whereby the rubber piece 9 is utilized to effect a frictional engagement of the turn signal indicator 13 inside the handlebar 11. When tightening the nut 10 or turning the housing 1 to thereby reduce the distance between the housing 1 and the nut 10 on the threaded pipe 7, an axial pressure force is applied on the rubber piece 9 to thereby compress the rubber piece 9. As a result of this compression, the rubber piece 9 deforms in a radial direction to effect the intended force-fitting engagement inside the handlebar 11.

Installation of the turn signal indicator 13 is executed in two steps. Initially, the nut 10 is so positioned relative to the spacer 8 that the outside diameter of the rubber piece 9 substantially corresponds to the inside diameter of the handlebar 11. A suitable dimensioning of the rubber piece 9 enables installation of the turn signal indicator 13 for all standard handlebars 11 with an inside diameter in the range of 16.5 mm to 25 mm. Subsequently, the mounting 22 comprised of spacer 8, rubber piece 9 and nut 10 is inserted into the open axial end 12 of the handlebar 11 until the housing 1 bears upon the handlebar end 12. A turning of the housing 1 by one or two revolutions is sufficient to ensure a secure attachment of the turn signal indicator 13 to the handlebar end 12, with the connection between the turn signal indicator 13 and the handlebar 11 being effected solely by the rubber piece 9 to create an elastic clamping action instead of a rigid connection. This type of elastic mounting in conjunction with the substantial housing mass suppresses vibrations in a superior manner.

Figure 3:
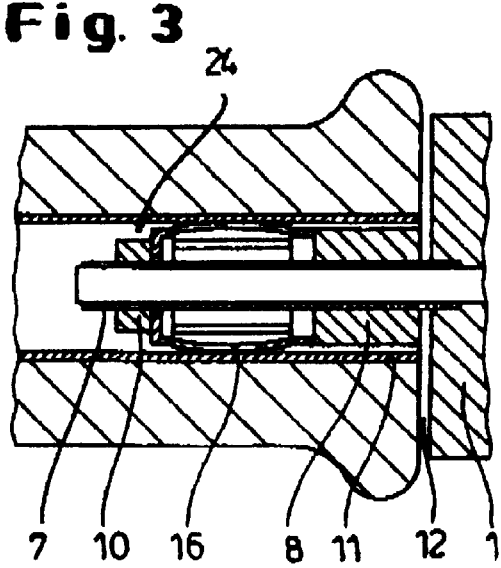
FIG. 3 is a longitudinal sectional view of a second embodiment of a turn signal indicator assembly according to the present invention, illustrating a modified mounting structure.
Figure 4:
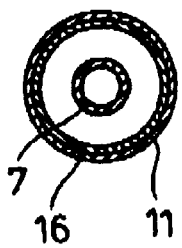
FIG. 4 is a cross sectional view of the turn signal indicator assembly of FIG.3.

Turning now to FIG. 3, there is shown a longitudinal sectional view of a second embodiment of a turn signal indicator assembly according to the present invention, equipped with a modified mounting, generally designated by reference numeral 24. Instead of using a rubber piece, the mounting 24 includes a spreader 16 for effecting an elastic connection between the handlebar 11 and the turn signal indicator 13. The spreader 16 can be made of sheet steel, Teflon, silicone or other plastic material and includes a barrel-shaped, thinwalled hollow body with an outer surface area that is formed with several slots to form a plurality of webs.

Installation of the turn signal indicator 13 to the handlebar end 12 by means of the mounting 24 is executed in a similar manner as previously described in connection with the embodiment of FIG. 1. Initially, the nut 10 is so positioned that the spreader 16 bears with one end on the nut 10 and with the other end on the spacer 8. Upon continuous tightening of the nut 10 in direction of the spacer 8, the spreader 16 is compressed in axial direction, thereby outwardly bending the webs and thus expanding the spreader 16 in radial direction. Tightening of the nut 10 is continued until the outer diameter of the spreader 16 substantially corresponds to the inside diameter of the handlebar 11. Subsequently, the mounting 24 is inserted through the open handlebar end 12 into the handlebar 11. A turning of the housing 1 effects a secure connection between the turn signal indicator 13 and the handlebar end 12.

While the invention has been illustrated and described as embodied in a turn signal indicator assembly, it is not intended to be limited to the details shown since various modifications and structural changes may be made without departing in any way from the spirit of the present invention.

What is claimed as new and desired to be protected by Letters Patent is set forth in the appended claims:

1. A turn signal indicator assembly for motorcycles, comprising a turn signal indicator attached to one end of a handlebar and having a mass of at least 150 gram.

2. The turn signal indicator assembly of claim 1 wherein the turn signal indicator has a mass between 200–400 gram.

3. The turn signal indicator assembly of claim 1 wherein the turn signal indicator is detachably secured to the end of the handlebar.

4. The turn signal indicator assembly of claim 1, and further comprising connection means in the form of a vibration-mechanically hinged connection for securing the turn signal indicator to the end of the handlebar.

5. The turn signal indicator assembly of claim 4 wherein the end of the handlebar is open, with the vibration-mechanically hinged connection being arranged in the open end of the handlebar.

6. The turn signal indicator assembly of claim 1, and further comprising a halogen lamp received in the turn signal indicator.

7. A turn signal indicator assembly for motorcycles, comprising a housing; a lamp unit received in the housing to radiate a signal light through a transparent section of the housing; and a mounting for securing the housing to an end of a handlebar, said housing together with the lamp unit having an overall mass of at least 150 gram, thereby reducing vibrations acting upon the end of the handlebar.

8. The turn signal indicator assembly of claim 7 wherein the housing together with the lamp unit have a mass between 200–400 gram.

9. The turn signal indicator assembly of claim 7 wherein the mounting includes an axially compressible member for expansion in a radial direction to secure the housing to the one end of the handlebar.

10. The turn signal indicator assembly of claim 9 wherein the compressible member is a rubber piece.

11. The turn signal indicator assembly of claim 9 wherein the compressible member is a spreader formed with axial slots to form outwardly bendable webs between the slots.

12. The turn signal indicator assembly of claim 9 wherein the compressible member is placed on a threaded pipe extending outwardly from the housing, said mounting including a nut screwed on the threaded pipe for traveling along the threaded pipe to thereby allow a compression of the compressible member.

13. The turn signal indicator assembly of claim 7 wherein the lamp unit includes a halogen lamp.

14. The turn signal indicator assembly of claim 7 wherein the housing is formed on one end thereof distant to the handlebar with a solid portion to realize the overall mass of at least 150 gram.

15. A method of attaching a turn signal indicator to one end of a handlebar of a motorcycle, with the turn signal indicator having an outwardly extending threaded member; comprising the steps of:

placing an axially compressible member over the threaded member;

tightening a nut placed on the threaded member adjacent to the compressible member to compress the axially compressible member against a spacer fixed in place on the threaded member, thereby effecting a radial expansion of the compressible member as to correspond to an inside diameter of a handlebar; and inserting the threaded member with the radially deformed compressible member into an end of the handlebar.

16. A turn signal indicator assembly for motorcycles, comprising, a housing secured to an end of a handlebar and extending from the handlebar in a longitudinal direction, a lamp unit received in the housing to radiate a halogen signal light; said housing having opposite sides, each opposite side provided with an opening at a central location thereof and transparently covered so that the signal light radiates therethrough, said covered openings are flush with the sidewalls of the housing.

17. The turn signal of claim 16, further comprising a mounting for the assembly including an axially compressible member for expansion in a radial direction to secure the housing to the one end of the handlebar.

18. The turn signal of claim 16, wherein the compressible member is a rubber piece.

19. The turn signal of claim 16, wherein the compressible member is a spreader formed with axial slots to form outwardly bendable webs between the slots.

20. The turn signal of claim 16, wherein the compressible member is placed on a threaded pipe extending outwardly from the housing, said mounting including a nut screwed on the threaded pipe for traveling along the threaded pipe to thereby allow a compression of the compressible member.

* * * * *